(12) United States Patent  (10) Patent No.: US 7,362,361 B2
Matsukawa  (45) Date of Patent: Apr. 22, 2008

(54) NOISE SUPPRESSING CIRCUIT USING LUMINANCE DETECTION

(75) Inventor: Nobuyuki Matsukawa, Yokosuka (JP)

(73) Assignee: Victor Compay of Japan, Ltd., Yokohama (JP)

( * ) Notice: Subject to any disclaimer, the term of this patent is extended or adjusted under 35 U.S.C. 154(b) by 713 days.

(21) Appl. No.: 10/995,101

(22) Filed: Nov. 24, 2004

(65) Prior Publication Data

US 2005/0200728 A1  Sep. 15, 2005

(30) Foreign Application Priority Data

Nov. 28, 2003 (JP) ............... 2003-399309

(51) Int. Cl.
   *H04N 5/217* (2006.01)
   *H04N 9/64* (2006.01)
   *H04N 5/00* (2006.01)
(52) U.S. Cl. .............. 348/241; 348/242; 348/250; 348/607; 348/608
(58) Field of Classification Search ........ 348/242, 348/250
   See application file for complete search history.

(56) References Cited

U.S. PATENT DOCUMENTS

| 5,406,391 A | * | 4/1995 | Takahashi | 358/482 |
| 6,078,686 A | * | 6/2000 | Kim | 382/167 |
| 2002/0114513 A1 | * | 8/2002 | Hirao | 382/167 |

FOREIGN PATENT DOCUMENTS

JP  2003-189126  7/2003

* cited by examiner

*Primary Examiner*—David Ometz
*Assistant Examiner*—Wanda M. Negrón
(74) *Attorney, Agent, or Firm*—Louis Woo (57) ABSTRACT

A technique of achieving optimal noise suppression with respect to a video signal whose noise amount differs according to brightness is disclosed, and according to the technique, a low-luminance detecting section 18 detects a video signal of a relatively low luminance, a suppression amount setting section 19 generates a noise suppression amount which becomes larger as the luminance of the video signal becomes lower, and a noise suppressing circuit 17 suppresses noise with the noise suppression amount generated by the suppression amount setting section with respect to the video signal of a relatively low luminance detected by the low-luminance detecting section.

15 Claims, 11 Drawing Sheets

| THRESHOLD | 0~D1 | D1~D2 | D2~D3 | ... | Dn-1~Dn |
|---|---|---|---|---|---|
| GAIN | K0 | K1 | K2 | ... | 1.0 |

FIG.5A

COMPARISON PROCESS SECTION:
$F(x) > m \cdot G : F(y) = F(x) - m \cdot G$
$-m \cdot G \leqq F(x) \leqq m \cdot G : F(y) = 0$
$F(x) < -m \cdot G : F(y) = F(x) + m \cdot G$

COMPARISON PROCESS SECTION S:

Nin > +A : Nout = 0
−A ≦ Nin ≦ +A : Nout = Nin
Nin < −A : Nout = 0

FIG.13A PRIOR ART

COMPARISON PROCESS SECTION T:

$F(x) > m0 : F(y) = F(x) - m0$
$-m0 \leqq F(x) \leqq m0 : F(y) = 0$
$F(x) < -m0 : F(y) = F(x) + m0$

FIG.13B PRIOR ART

NOISE SUPPRESSING CIRCUIT USING LUMINANCE DETECTION

BACKGROUND OF THE INVENTION

1. Field of the Invention

The present invention relates to a noise suppressing circuit suitable for a video camera image pickup device using a progressive scan CCD, and, more particularly, to a circuit which suppresses noise in a color signal component.

2. Background Art

Figure 11:
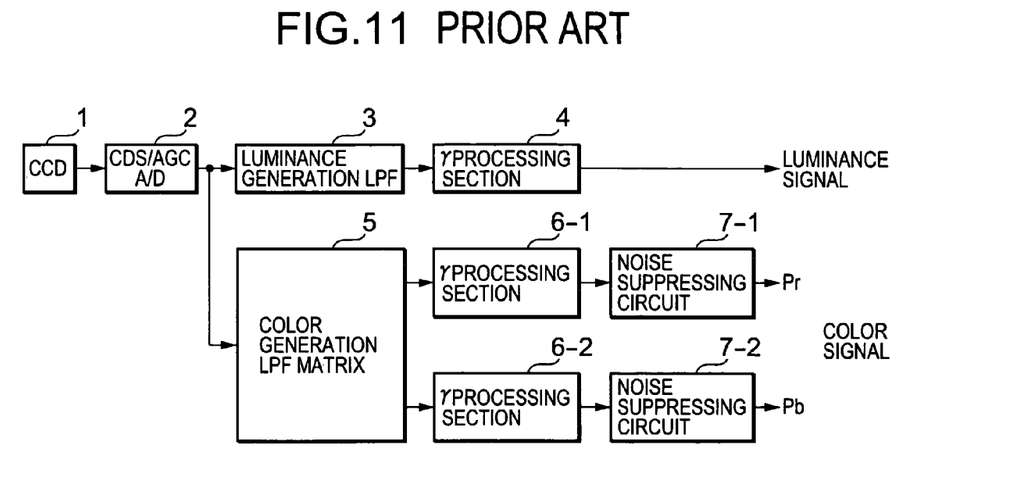
FIG. 11 is a block diagram showing an image pickup device to which a conventional noise suppressing circuit is adapted.

One example of a conventional image pickup device is described in the following Patent Literature 1. FIG. 11 is a block diagram showing the conventional image pickup device. The output signal of a CCD 1 goes through a CDS (Correlated Double Sampling)/AGC A/D block 2, and a digital signal is applied to a luminance generation LPF 3 and a color generation LPF matrix 5. A luminance signal is generated in the luminance generation LPF 3, and the luminance signal is then subjected to γ correction by a γ processing section 4. Two color signals are generated in the color generation LPF matrix 5, the color signals are then subjected to γ correction by γ processing sections 6-1 and 6-2, respectively, and those color signals are respectively applied to noise suppressing circuits 7-1 and 7-2 to suppress noise in color signals.

Figure 12:
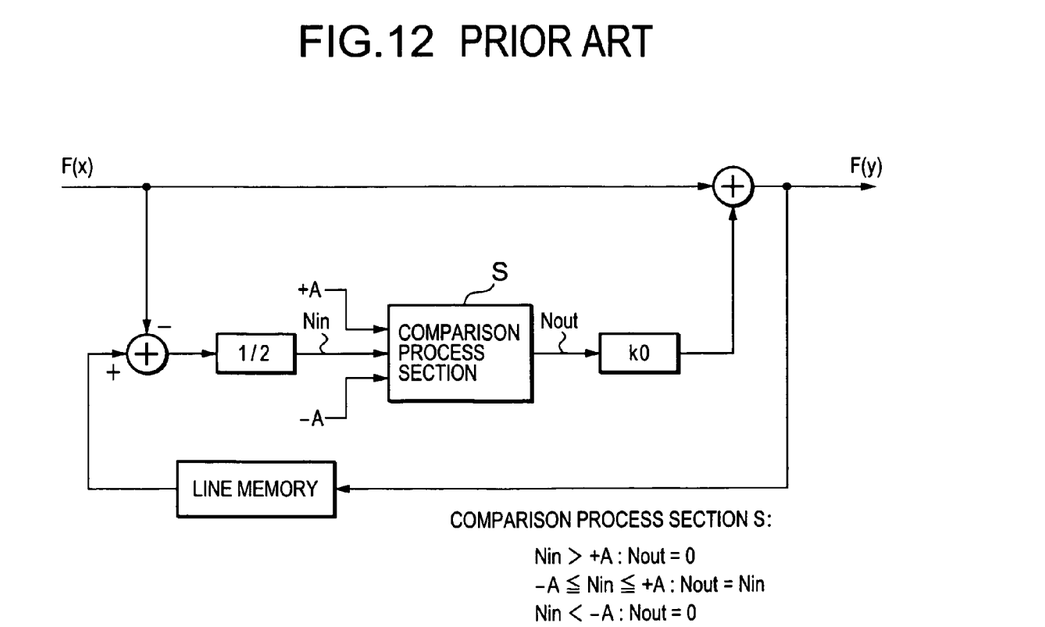
FIG. 12 is a block diagram showing one example of the noise suppressing circuit in FIG. 11.

FIG. 12 shows a noise feedback IIR (Infinite Impulse Response) filter using a 1H line memory. After the gain of the output signal of a subtracter is halved by a gain controller (which is actually realized merely by bit shifting because the signal is a digital signal), a comparison process section S which passes only a small amplitude is intervened. As shown in FIG. 12, the contents of the comparison operation of the comparison process section S are such that given that the size of the output signal of the gain controller is Nin, in both cases where Nin is greater than a predetermined value +A, and where Nin is smaller than the predetermined value +A, an output signal Nout of the comparison process section S is 0, whereas when Nin is equal to or smaller than the predetermined value +A and is equal to or greater than a predetermined value −A, Nin is output as it is. Without this process, the output of the subtracter is supplied to an adder on the right side and is circulated via the line memory, so that components of plural lines are added regardless of the amplitude, but when the noise suppressing circuits 7-1 and 7-2 are inserted in the color signal system, the color is blurred in the vertical direction. To prevent it, only a small amplitude component, such as noise, in the subtracter output is passed, thereby ensuring noise suppression with less color blurring. According to the prior art, the value of k is fixed, and is a block of a gain k0. Therefore, ½·k0 becomes the gain of the loop part. In FIG. 12, therefore, only when Nin is equal to or smaller than the predetermined value +A and is equal to or greater than the predetermined value −A, the noise component of an output F(y) is suppressed with a feedback amount k with respect to an input F(x) as follows.

$$F(y)=\{F(y-1)-F(x)\}\times\tfrac{1}{2}\cdot k+F(x)$$

Figure 13A:
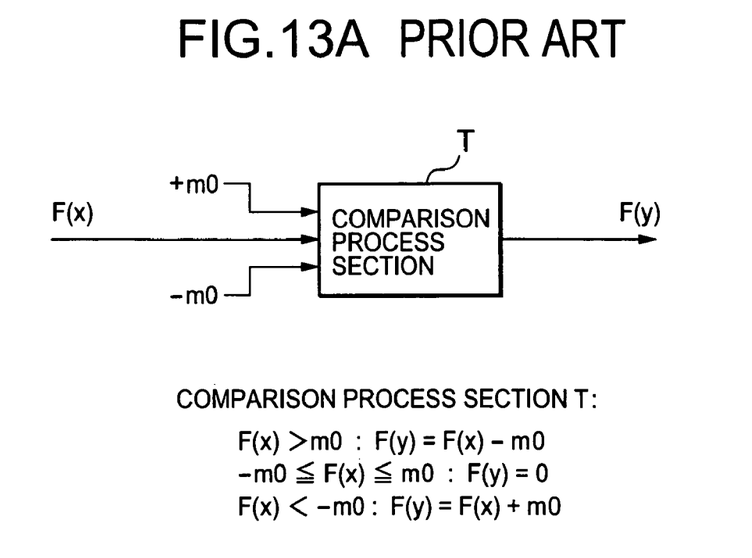
FIG. 13A is a block diagram showing another example of the noise suppressing circuit in FIG. 11.
Figure 13B:
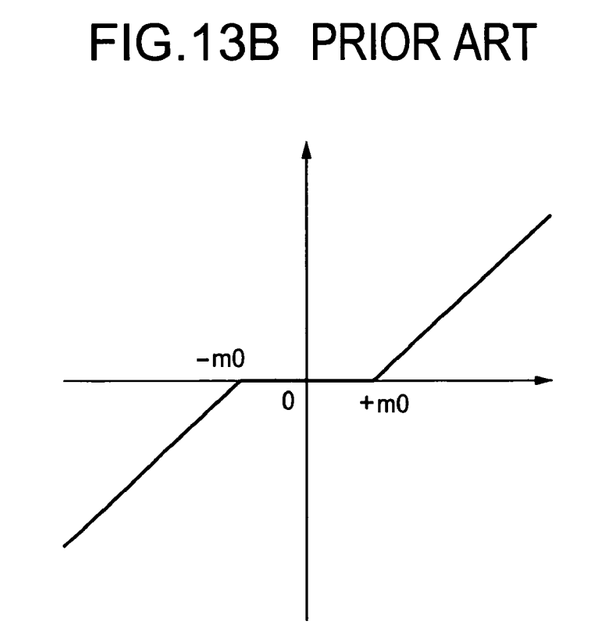
FIG. 13B is an explanatory diagram explaining the operation of the noise suppressing circuit in FIG. 13A.

FIG. 13A shows a coring circuit, as another example of the noise suppressing circuit 7-1, 7-2, which improves the S/N ratio at a low illuminance by clipping or performing non-linear suppression of the level of a chroma signal near a low illuminance region. With the structure in FIG. 13A, a comparison process section T operates as follows, and the noise component of the output F(y) is suppressed with a coring amount m with respect to the input F(x) as shown in FIG. 13B.

When F(x)>m0, F(y)=F(x)−m0
When −m0≦F(x)≦m0, F(y)=0
When F(x)<−m0, F(y)=F(x)+m0

According to the noise suppressing circuit 7-1 and 7-2, when the CCD 1 is an interline type (IL-CCD), upper and lower lines are mixed at the time of scanning, so that a sufficient noise suppression effect (noise component averaging) can be obtained. Patent Literature 1: Japanese Patent Laid-Open Publication No. 2003-189126 (FIG. 1).

Because the PS (Progressive Scan) type CCD (PS-CCD) which is of a type that scans all the pixels scans upper and lower lines without mixing them at the time of CCD scanning, however, the noise component is said to be worse by $\sqrt{2}$ times (The Journal of the Institute of Television Engineers of Japan: Proposal of Simultaneous Independent Double Line Scanning IL-CCD). To acquire a noise suppression effect equivalent to that of the IL-CCD, therefore, a stronger suppression coefficient (feedback amount k or coring m) should be applied. However, in case of the noise feedback type, stronger application brings about a lasting effect on video images or so, or in the coring process, a phenomenon that coloring is not provided at the time of a low luminance, so that too much application cannot be made.

A solid state image pickup device has a property such that the amount of noise differs according to the output value (brightness), and each scheme mentioned above applies the same suppression to all the pixels, so that if noise suppression of a sufficient intensity is applied to every output value, suppression becomes stronger on pixels with few noise, making the side effect greater, and if suppression is made weaker to avoid it, there may be pixels which cannot bring about a sufficient noise canceling effect.

SUMMARY OF THE INVENTION

In consideration of the problems of the prior arts, the present invention aims at providing a noise suppressing circuit capable of achieving optimal noise suppression with respect to a video signal whose noise amount differs according to brightness.

To achieve the object, a noise suppressing circuit according to the invention is designed to comprise:

color-signal component extraction means which extracts a color signal component in an input video signal;

low-luminance detection means which detects that luminance of the input video signal is lower than a predetermined value;

noise-suppression amount signal generation means that generates a signal indicative of a noise suppression amount, which is a value which becomes greater as the luminance of the input video signal becomes lower and suppresses noise in the color signal component, in response to an output signal of the low-luminance detection means only when the luminance of the input video signal is lower than the predetermined value; and noise suppression means which suppresses noise with the noise suppression amount generated by the noise-suppression amount signal generation means with respect to the color signal component extracted by the color-signal component extraction means.

To achieve the object, a noise suppressing circuit according to the invention is designed to comprise:

luminance-signal component extraction means which extracts a luminance signal component in an input video signal;

low-luminance detection means which detects that luminance of the input video signal is lower than a predetermined value;

noise-suppression amount signal generation means that generates a signal indicative of a noise suppression amount, which is a value which becomes greater as the luminance of the input video signal becomes lower and suppresses noise in the luminance signal component, in response to an output signal of the low-luminance detection means only when the luminance of the input video signal is lower than the predetermined value; and noise suppression means which suppresses noise with the noise suppression amount generated by the noise-suppression amount signal generation means with respect to the luminance signal component extracted by the luminance-signal component extraction means.

To achieve the object, a noise suppressing circuit according to the invention is designed to comprise:

color-signal component extraction means which extracts a color signal component in an input video signal;

luminance-signal component extraction means which extracts a luminance signal component in the input video signal;

low-luminance detection means which detects that luminance of the input video signal is lower than a predetermined value;

noise-suppression amount signal generation means that generates a first signal indicative of a first noise suppression amount, which is a value which becomes greater as the luminance of the input video signal becomes lower and suppresses noise in the color signal component, and a second signal indicative of a second noise suppression amount, which is a value which becomes greater as the luminance of the input video signal becomes lower and suppresses noise in the luminance signal component, in response to an output signal of the low-luminance detection means only when the luminance of the input video signal is lower than the predetermined value;

first noise suppression means which suppresses noise with the first noise suppression amount generated by the noise-suppression amount signal generation means with respect to the color signal component extracted by the color-signal component extraction means; and second noise suppression means which suppresses noise with the second noise suppression amount generated by the noise-suppression amount signal generation means with respect to the luminance signal component extracted by the luminance-signal component extraction means.

According to the invention, noise is suppressed with a noise suppression amount which becomes larger as the luminance becomes lower, with respect to a video signal of a relatively low luminance, so that optimal noise suppression can be achieved with respect to a video signal whose noise amount becomes greater as the luminance gets lower.

DESCRIPTION OF THE PREFERRED EMBODIMENTS OF THE INVENTION

First Embodiment

Figure 1:
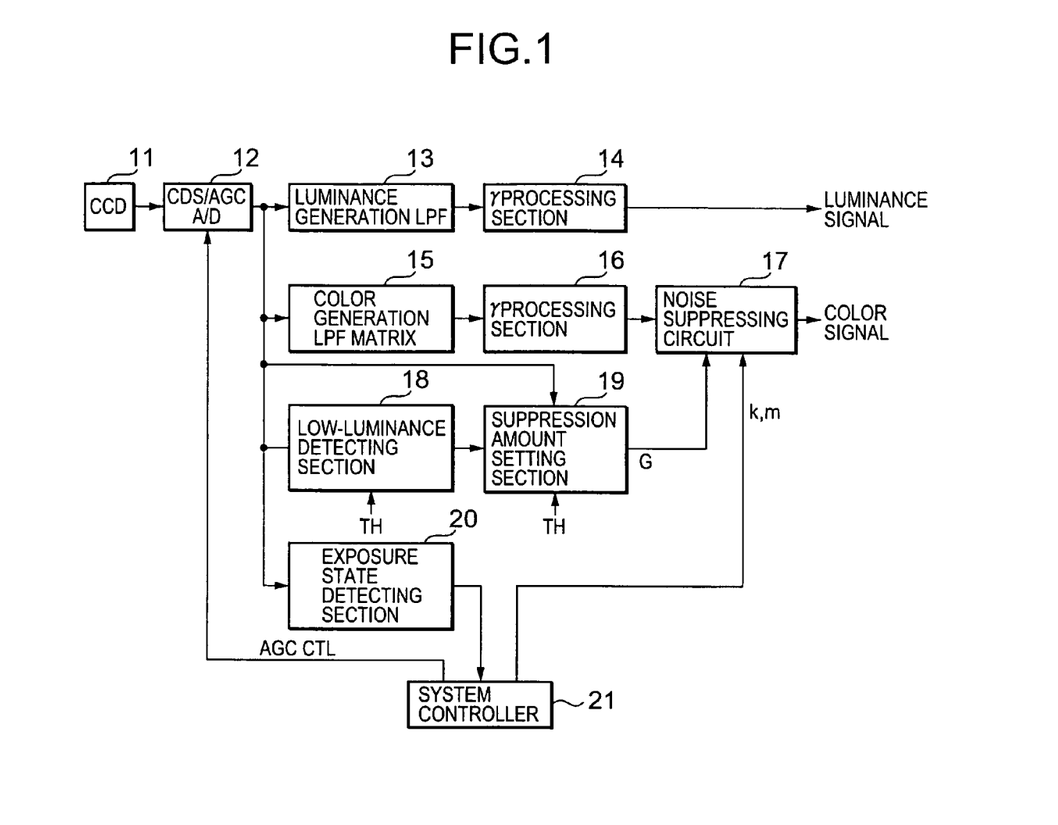
FIG. 1 is a block diagram showing an image pickup device to which the first embodiment of a noise suppressing circuit according to the invention is adapted.
Figure 2:
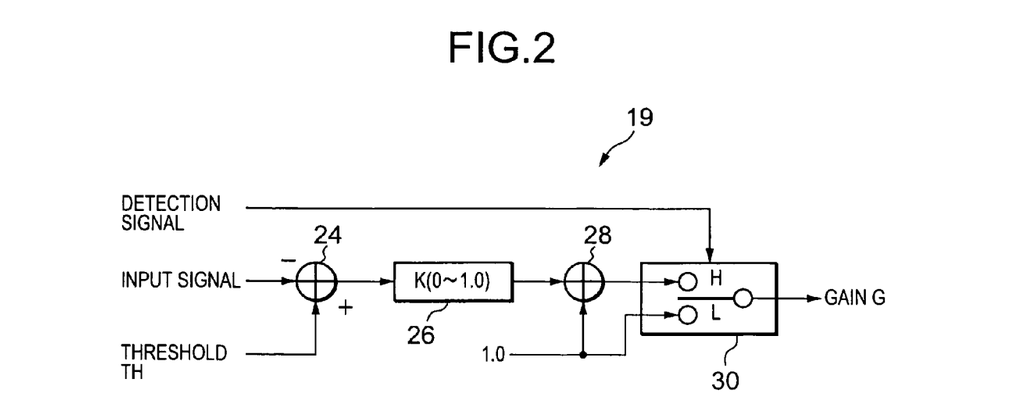
FIG. 2 is a block diagram for explaining the process of a suppression amount setting section in FIG. 1.
Figure 3A:
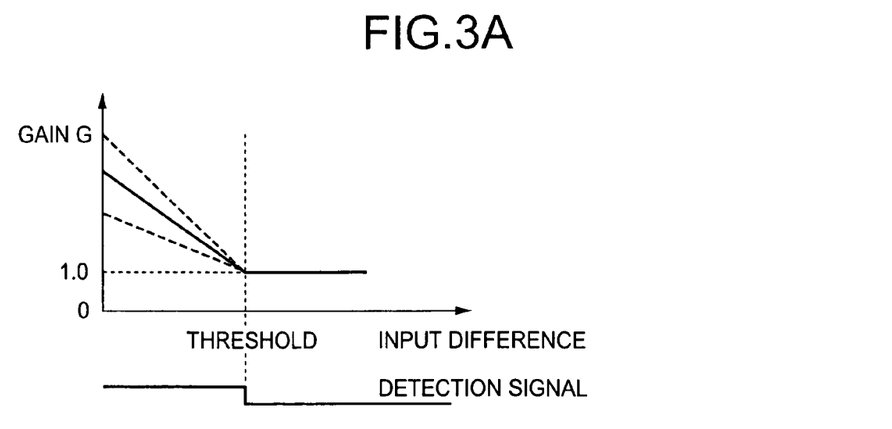
FIG. 3A is an explanatory diagram illustrating one example of gain setting of the noise suppression amount by the suppression amount setting section in FIG. 2.
Figure 3B:
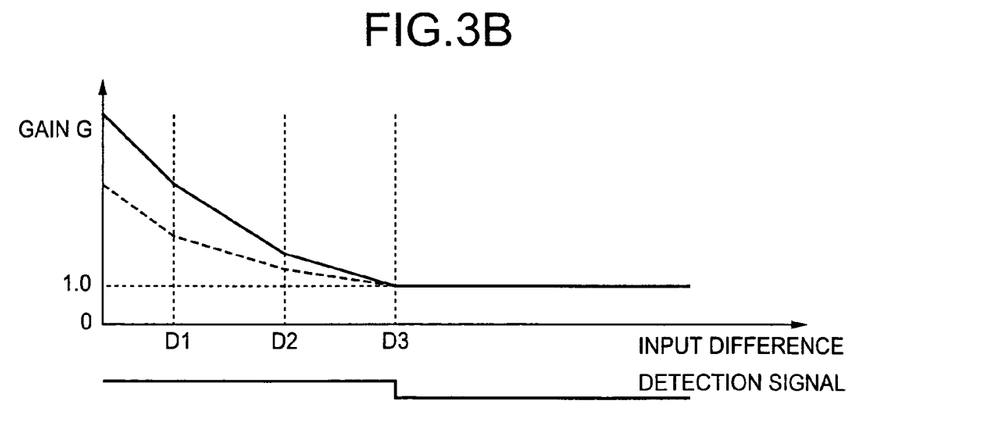
FIG. 3B is an explanatory diagram illustrating another example of gain setting of the noise suppression amount by the suppression amount setting section in FIG. 2.
Figure 3C:
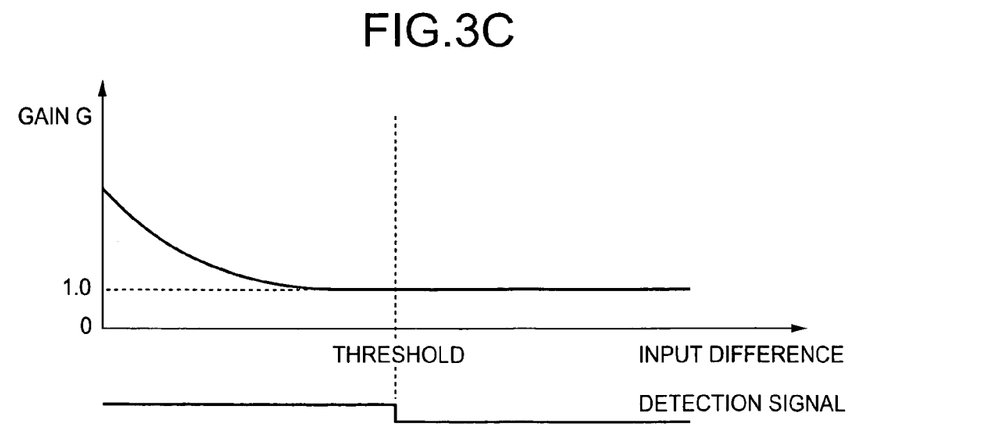
FIG. 3C is an explanatory diagram illustrating a further example of gain setting of the noise suppression amount by the suppression amount setting section in FIG. 2.

An embodiment of the invention will be described below with reference to the accompanying drawings. FIG. 1 is a block diagram showing an image pickup device to which the first embodiment of a noise suppressing circuit according to the invention is adapted, FIG. 2 is a block diagram for explaining the process of a suppression amount setting section in FIG. 1, and FIG. 3A is an explanatory diagram illustrating one example of gain setting of the noise suppression amount by the suppression amount setting section in FIG. 2.

In FIG. 1, a video signal output from a progressive scan image pickup device (PS-CCD) (indicated by CCD in FIG. 1) 11 goes through a CDS/AGC A/D block 12 and is applied to a luminance generation LPF 13, a color generation LPF matrix 15 and a low-luminance detecting section 18. A luminance signal is generated in the luminance generation LPF 13, and the luminance signal is then subjected to γ correction by a γ processing section 14. A color signal is generated in the color generation LPF matrix 15, the color signal is then subjected to γ correction by a γ processing section 16, and the color signal is applied to a noise suppressing circuit 17. The output signal of the CDS/AGC A/D block 12 is applied to an exposure state detecting section 20, and the output signal of the exposure state detecting section 20 is supplied to a system controller 21. The system controller 21 supplies the CDS/AGC A/D block 12 with an AGC control signal AGC CTL and supplies the noise suppressing circuit 17 with a suppression coefficient k or m. The exposure state detecting section 20, which is similar to the conventional one, detects the amount of light of a picked-up image to discriminate the exposure state, and the system controller 21 performs auto iris control with an unillustrated structure by using the discrimination result. When auto iris control alone is insufficient as in case where the amount of light becomes insufficient even with the iris open, however, the system controller 21 controls the CDS/AGC A/D block 12 with the AGC control signal AGC CTL, multiplies the input signal by a gain coefficient to increase the signal level. The increase in signal level by the multiplication of the gain coefficient leads to an increase in noise component, which can be a cause for degrading the image quality. However, the noise suppressing operation of the invention to be discussed later can suppress the noise level low.

As the input signal is an independent signal with unmixed pixels, one threshold TH is set in the low-luminance detecting section 18, and a 1-bit (bit) detection signal which becomes 1 for a signal lower than the threshold, and 0 for a signal higher than the threshold, and is sent to a suppression amount setting section 19. The suppression amount setting section 19 sets a suppression gain G with respect to the suppression coefficient k or m according to the detection signal. The suppression gain G is set here, as shown in FIG. 2, by subtracting the input signal (F(x)) from the threshold by a subtracter 24, multiplying the different data (=TH−F(x)) by an inclination K of 0 to 1.0 by a multiplier (coefficient multiplier) 26, and adding 1.0 to the acquired value by an adder 28. This provides a control signal of a suppression gain G according to the input signal F(x) as follows.

$$G=\{TH-F(x)\}\times K+1 \qquad (1)$$

When TH−F(x) is negative, the detection signal becomes 0, so that an output switch 30 is switched to an L side from an H side and 1.0 is output as the gain G from the output switch 30.

Finally, based on the detection signal generated by the low-luminance detecting section 18, the suppression gain G in equation (1) for the input signal F(x) smaller than the threshold TH or 1.0 for a larger value is input to the noise suppressing circuit 17 as the suppression gain G for the suppression coefficient k or m, so that flexible noise suppression control can be performed only on a low luminance part. According to the control, as shown in FIG. 3A, the suppression gain G which should always be 1 is set for the input signal F(x) which exceeds the threshold TH, and the suppression gain G is controlled in such a way that the noise suppression amount becomes greater for the input signal less than the threshold, thus ensuring natural noise suppression control.

Figure 3D:
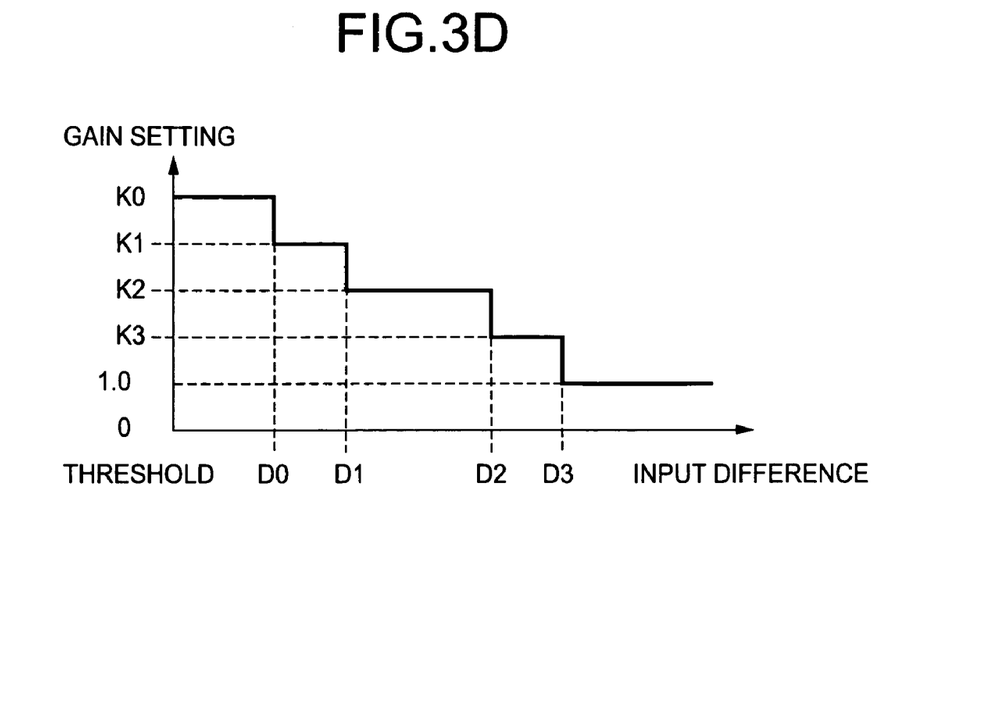
FIG. 3D is an explanatory diagram illustrating a still further example of gain setting of the noise suppression amount by the suppression amount setting section in FIG. 2.
Figure 3E:
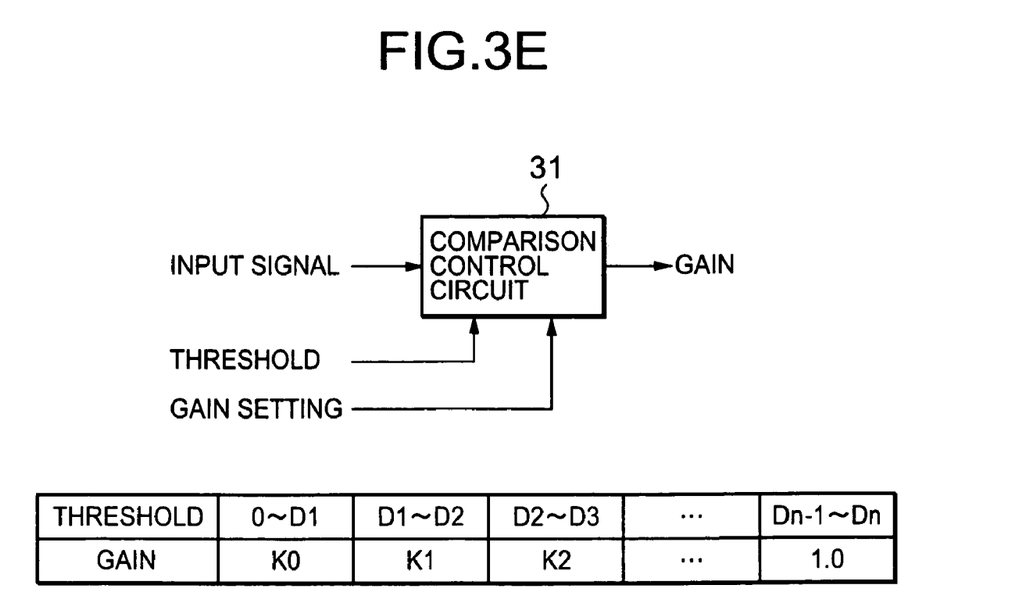
FIG. 3E is an explanatory diagram illustrating a yet still further example of gain setting of the noise suppression amount by the suppression amount setting section in FIG. 2.

Although the value of the suppression gain G varies linearly at or less than the threshold in the example of the gain setting illustrated in FIG. 3A, the value of the suppression gain G can be changed in various ways according to the specific adaptation state of the noise suppression required. FIGS. 3B to 3E are explanatory diagrams respectively illustrating other four examples of the gain setting of the noise suppression amount by the suppression amount setting section 19 in FIG. 2. That is, in case of FIG. 3B, highly accurate setting of the suppression gain G can be achieved by forming a veered line with several transition points D1, D2 and D3. Further, in case of FIG. 3C, noise control with smoother setting of the suppression gain G is possible by making the suppression control curve a curve, not a line. The curve can be realized by reading and using ROM data or so computed and saved beforehand. Further, the case of FIG. 3D employs the structure which allows a microcomputer to set thresholds (D0, D1, D2, . . . ) and gains (K0, K1, K2, . . . ). The structure in FIG. 3E shows an example where the thresholds (D0, D1, D2, . . . ) and gains (K0, K1, K2, . . . ) as shown in FIG. 3D are given to a comparison control circuit 31 which responds to an input signal to acquire a gain which changes stepwise according to the threshold.

Figure 4:
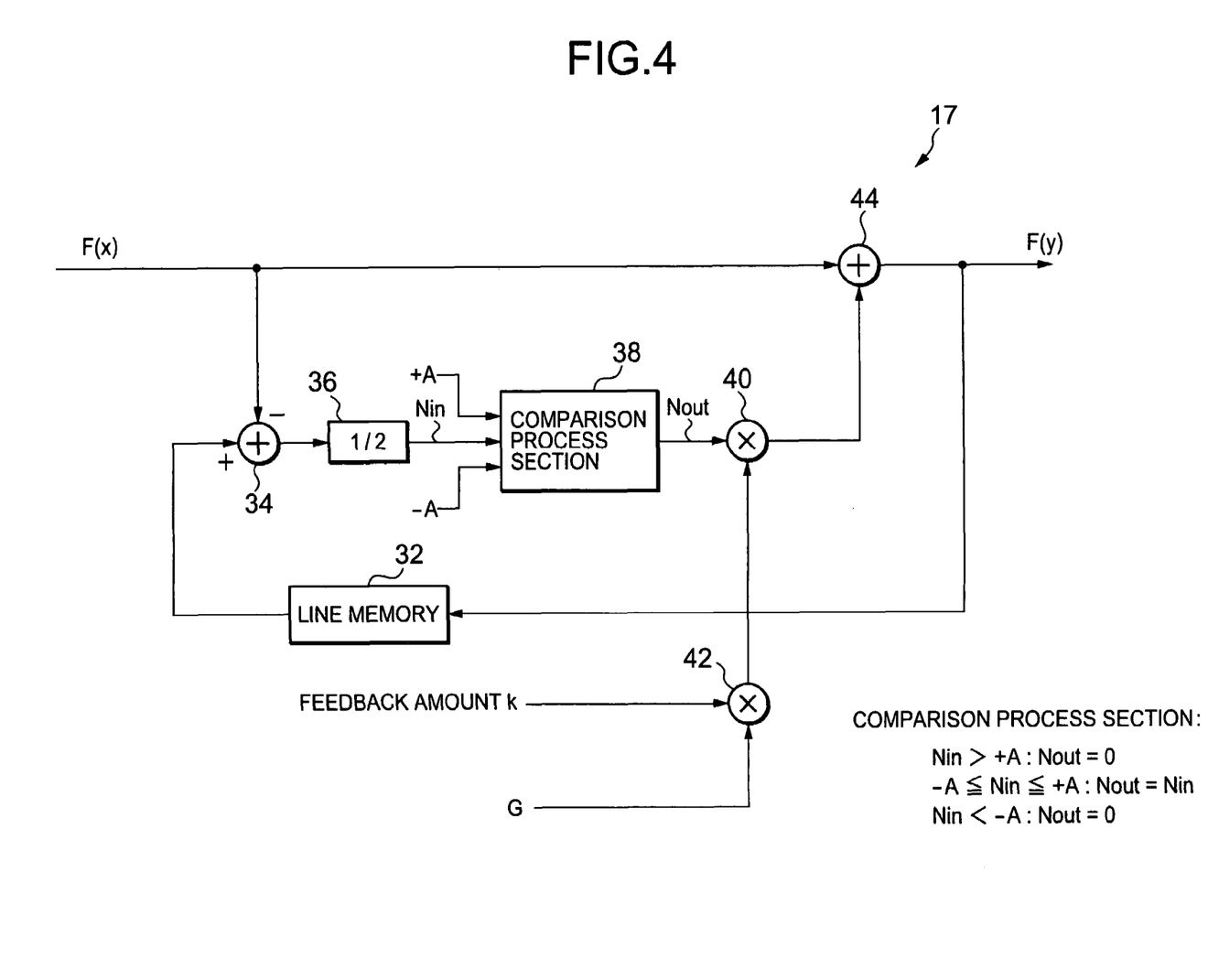
FIG. 4 is a block diagram showing one example of the noise suppressing circuit in FIG. 1.

FIG. 4 shows a noise feedback IIR (Infinite Impulse Response) filter using a 1H line memory as one example of the noise suppressing circuit 17. In the structure in FIG. 4, a comparison process section 38 which passes only a small amplitude is intervened after the gain of the output signal of a subtracter 34 is halved by a gain controller 36 (which is actually realized merely by bit shifting because the signal is a digital signal) as per the conventional structure in FIG. 12. As shown in FIG. 4, the contents of the comparison operation of the comparison process section 38 are such that given that the size of the output signal of the gain controller is Nin, in both cases where Nin is greater than a predetermined value +A, and where Nin is smaller than the predetermined value +A, an output signal Nout of the comparison process section 38 is 0, whereas when Nin is equal to or smaller than the predetermined value +A and is equal to or greater than a predetermined value −A, Nin is output as it is. In the noise suppressing circuit 17 in FIG. 4, therefore, when {F(y−1)−F(x)}·½=Nin is equal to or greater than the predetermined value −A and is equal to or smaller than the predetermined value +A, the noise component of an output F(y) is suppressed with a feedback amount (suppression coefficient) k and a suppression gain G with respect to an input F(x) as follows.

$$F(y)=\{F(y-1)-F(x)\}\cdot\tfrac{1}{2}\times k\times G+F(x)$$

In FIG. 4, symbols 40 and 42 denote multipliers, and symbol 44 denotes an adder.

Figure 5A:
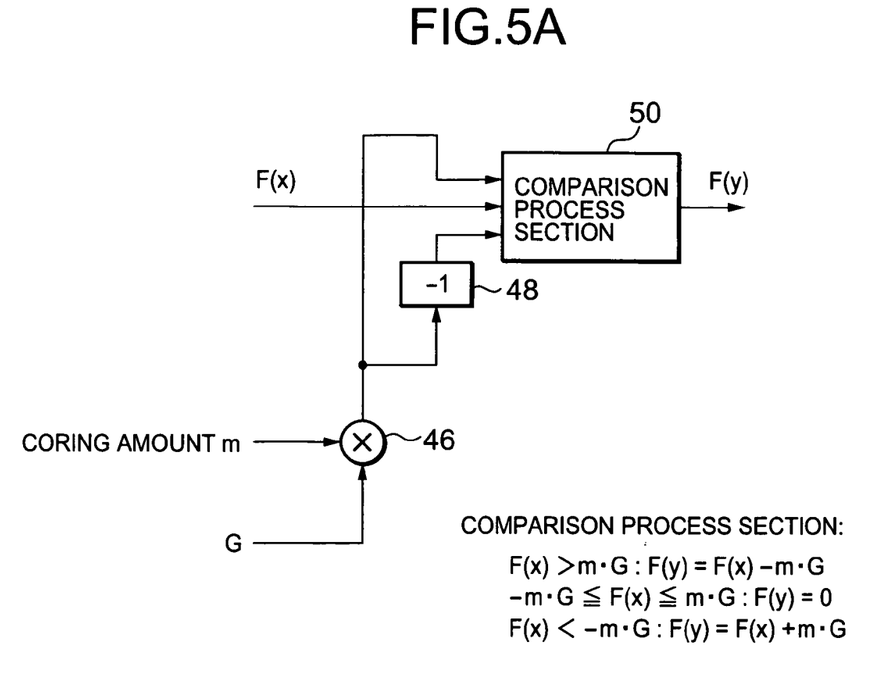
FIG. 5A is a block diagram showing another example of the noise suppressing circuit in FIG. 1.

FIG. 5A shows a coring circuit, as another example of the noise suppressing circuit 17, which improves the S/N ratio at a low illuminance by clipping or performing non-linear suppression of the level of a chroma signal near a low illuminance region. In FIG. 5A, a comparison process section 50 operates as follows, and the noise component of the output F(y) is suppressed with a coring amount (suppression coefficient) m and a suppression gain G with respect to the input F(x).

When $F(x)>m\cdot G$, $F(y)=F(x)-m\cdot G$
When $-m\cdot G\leq F(x)\leq m\cdot G$, $F(y)=0$
When $F(x)<-m\cdot G$, $F(y)=F(x)+m\cdot G$ In FIG. 5A, 46 is a multiplier which multiplies the coring amount m by the gain G, and 48 is an inverter which inverts the output signal m·G of the multiplier 46 to −m·G.

Figure 5B:
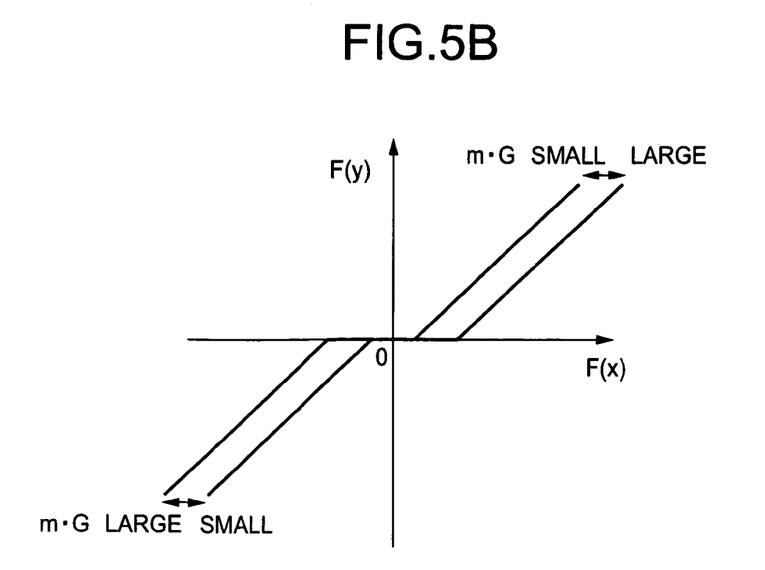
FIG. 5B is an explanatory diagram explaining the operation of the noise suppressing circuit in FIG. 5A.

While the comparison process section 50 compares the input signal F(x) with m·G and −m·G, −m·G is generated by the inverter 48 and is supplied to the comparison circuit. While FIG. 5B shows a difference in characteristic with the size of the value of m·G, the range where the output is set to "0" by coring becomes wider as the value of m·G becomes larger, so that even large noise is suppressed (for even the amount of a detailed portion of a pattern which is to be lost becomes larger as a side effect), and when the value of m·G is small, the range where the output is set to "0" is small, so that the noise suppression amount becomes smaller but with a smaller side effect of losing a detailed portion of a pattern. According to the invention, this circuit is adapted to a dot sequential signal.

Considering the noise suppression amount in the structure in FIG. 5A, the amount of the S/N improvement is given in such a recursive noise suppressing circuit by $$\sqrt{\{(1-p)/(1+p)\}}$$

where p is the gain of the recursive portion.

In case of FIG. 12 (prior art), $p=(½)·K_0$.

In case of FIG. 4 (the embodiment of the invention), $p=(½)·K·G$ (where $0<p<1$ and the circuit oscillates when p exceeds 1).

The following is the ground for computation of the amount of the S/N improvement.

$$\begin{aligned}
F(y) &= \{F(y-1) - F(x)\} \cdot p + F(x) \\
&= p \cdot F(y-1) + (1-p) \cdot F(x) \\
&= p \cdot \{p \cdot F(y-2) + (1-p) \cdot F(x-1)\} + (1-p) \cdot F(x) \\
&= p^2 \cdot F(y-2) + (1-p) \cdot F(x) + p \cdot (1-p) \cdot F(x-1) \\
&= p^2 \cdot \{p \cdot F(y-3) + (1-p) \cdot F(x-2)\} + (1-p) \cdot F(x) + \\
&\quad p \cdot (1-p) \cdot F(x-1) \\
&= p^3 \cdot F(y-4) + \{(1-p) \cdot F(x) + p \cdot (1-p) \cdot F(x-1) + \\
&\quad p^2 \cdot (1-p) \cdot F(x-2)\} \\
&\ldots \\
&= p^n \cdot F(p-n-1) + (1-p) \cdot \\
&\quad (1 \cdot F(x) + p \cdot F(x-1) + p^2 \cdot F(x-2) + p^3 \cdot F(x-3) + \ldots)
\end{aligned}$$

It is assumed that the energies FN of noise in individual lines are the same. In general, as the sum of noises becomes the square root of the sum of squares, provided that the energy of noise in the output of the noise suppressing circuit is Nout, $$=p^n \cdot F(p-n-1)+(1-p)\cdot\sqrt{\{(1+p^2+(p^2)^2+(p^3)^2\ldots)\}}\cdot FN$$

Given that n is infinite, the first term becomes 0 for $0<p<1$, and $$\begin{aligned}
Nout &= (1-p) \cdot \sqrt{\{(1/(1-p^2)) \cdot FN\}} \\
&= \sqrt{\{(1-p)^2/((1+p)\cdot(1-p))\}} \cdot FN \\
&= \sqrt{\{(1-p)/(1+p)\}} \cdot FN
\end{aligned}$$

Thus, S/N is improved by $\sqrt{\{(1-p)/(1+p)\}}$.

The relationship (theoretical values) between this p and the noise ratio of the input and output of the noise suppressing circuit is given in a table as follows.

TABLE 1

| P | Nout/FN | Nout/FN (decibel) |
|---|---------|-------------------|
| 0 | 1.0000 | 0 |
| 0.1 | 0.9045 | −0.8715 |
| 0.2 | 0.8165 | −1.7609 |
| 0.3 | 0.7338 | −2.6885 |
| 0.4 | 0.6547 | −3.6798 |
| 0.5 | 0.5774 | −4.7712 |
| 0.6 | 0.5000 | −6.0206 |
| 0.7 | 0.4201 | −7.5333 |
| 0.8 | 0.3333 | −9.5424 |
| 0.9 | 0.2294 | −12.7875 |

It is apparent that the greater (closer to 1) the value of p, the greater the SN improvement effect, but the greater the side effect such that signals from multiple lines (horizontal lines constituting the raster) are mixed, causing blurring in the vertical direction as discussed next. The practically usable p is therefore equal to or less than 0.6 or so.

Figure 6:
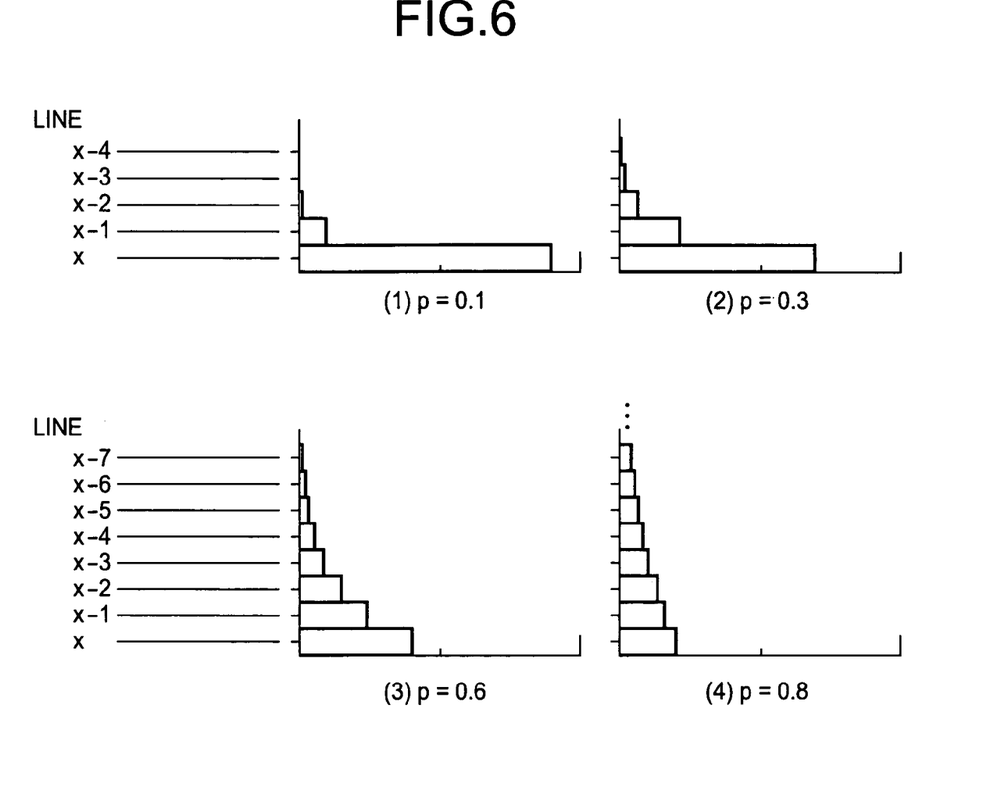
FIG. 6 is an explanatory diagram explaining the operation of the noise suppressing circuit of the invention.

FIG. 6 shows the ratio of addition of the individual lines by the loop of the noise suppressing circuit for various values of p. The following gives a description on a small-amplitude signal which passes the comparison process section 38 in FIG. 4. In FIG. 6, the left-hand side shows the horizontal lines by lateral lines, line "x" represents the line that is coming at present, and lines "x−1", etc. represent previous lines. The ratio of the amount of information of that line contained in the output of the noise suppressing circuit is given to the right. For example, when p=0.1 ((1) in FIG. 6), about 90% of the output of the noise suppressing circuit is information from the current line, and information previous by one line is added to about 10%. It is apparent that when p=0.3 ((2) in FIG. 6), a certain amount of information from lines previous by up to two lines is added, and just a very small amount of information from older lines is added. When p=0.8 ((4) in FIG. 6), older lines are added in a considerably large ratio of "x" to "x−1", "x−2", . . . , which means that information in the vertical direction on a pattern is mixed, so that a picture is blurred.

As apparent from the above, in the noise suppressing circuit as shown in FIG. 4 or 12, the closer to 1 the value of the gain p of the loop gets, the greater the noise improvement amount becomes, so that it can be said that it would be better to set the noise improvement amount to a level at which the minimum S/N improvement effect can be obtained. With regard to this point, the invention can provide the noise suppression effect wherever really necessary, brining about a great effect that the image quality does is not degraded unnecessarily.

Next, the operation of the circuit in FIG. 5A will be explained referring to waveform examples, and the structure being adaptable to a dot sequential signal will also be explained.

Figure 7A:
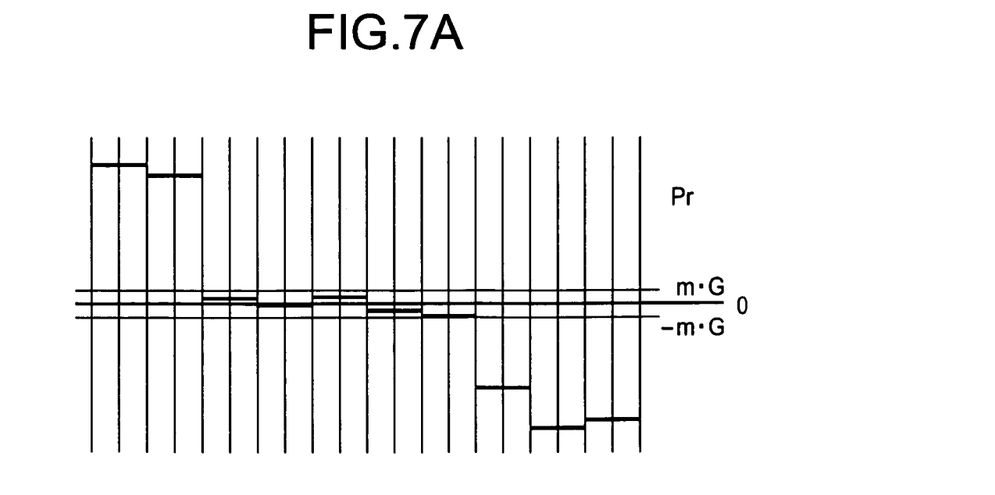
FIG. 7A is an explanatory diagram explaining adaptation of the noise suppressing circuit of the invention to a dot sequential signal.
Figure 7B:
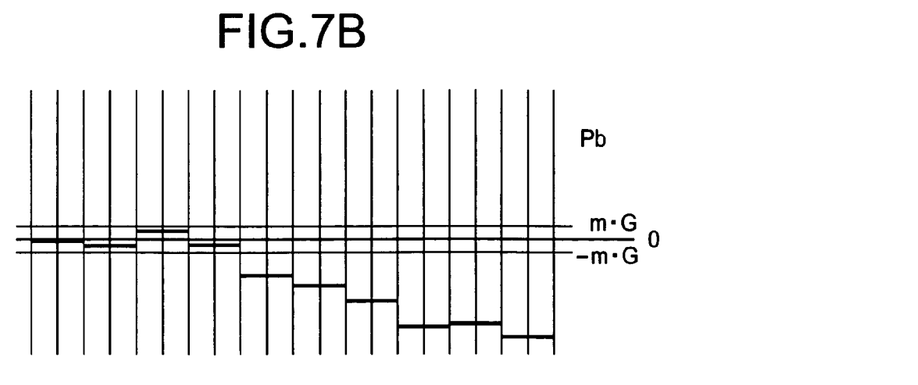
FIG. 7B is an explanatory diagram explaining adaptation of the noise suppressing circuit of the invention to a dot sequential signal.
Figure 7C:
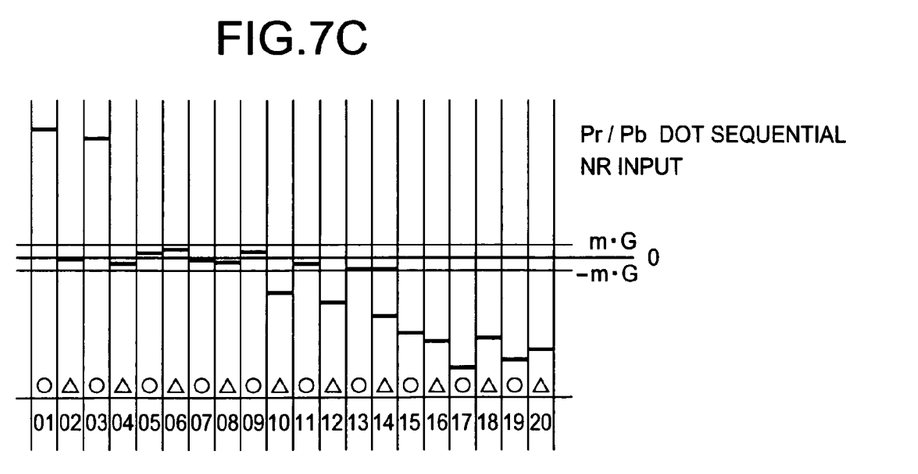
FIG. 7C is an explanatory diagram explaining adaptation of the noise suppressing circuit of the invention to a dot sequential signal.
Figure 7D:
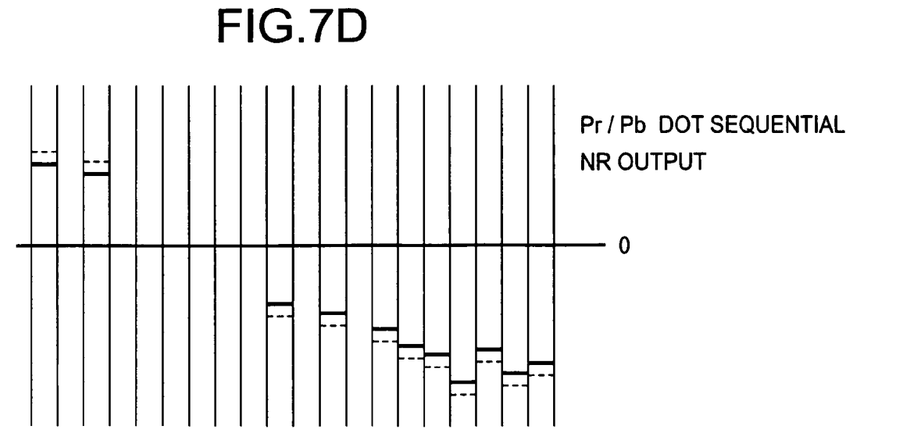
FIG. 7D is an explanatory diagram explaining adaptation of the noise suppressing circuit of the invention to a dot sequential signal.

Referring to FIGS. 7A to 7D, an example where the noise suppressing circuit in FIG. 5A is adapted to a dot sequential color signal. FIGS. 7A and 7B show examples of the sampled values of components Pr and Pb of a color signal in an analogous form. Signals when those components are transferred in a dot sequential manner, i.e., in a sequence of pixels become as shown in FIG. 7C. Here, "O" represents a transfer sample of the signal of Pr, and "Δ" represents a transfer sample of the signal of Pb, and they are alternately sent in a given period T sequentially as indicated by numbers in FIG. 7C. With the noise suppressing circuit in FIG. 5A adapted to such a dot sequential signal, when the value of the signal is a value between −m·G and m·G whose absolute value is small, it is "0", when the value is larger than m·G, the output becomes F(x)−m·G, and when the value is smaller than −m·G, the output becomes F(x)+m·G, so that the output of the noise suppressing circuit becomes like a solid line in FIG. 7D. For those outputs which are not zero, the signal values at the input are indicated by dotted lines.

As apparent from the above, the noise suppressing circuit in FIG. 5A is not independently adapted to each signal of color signals but can also be adapted to a dot sequential signal of a single system. The noise suppressing circuit 17 in FIG. 4 can also be adapted to a dot sequential signal if the positions of pixels of the dot sequential signal correspond to the individual lines at the input and output of the line memory.

The structure of making two color signals into a dot sequential signal and causing the signal to pass through the noise suppressing circuit brings about a characteristic such that a single noise suppressing circuit will do, as opposed to the provision of noise suppressing circuits respectively for two color signals as in the prior art, so that the circuit becomes simpler, lowering the cost.

Figure 8:
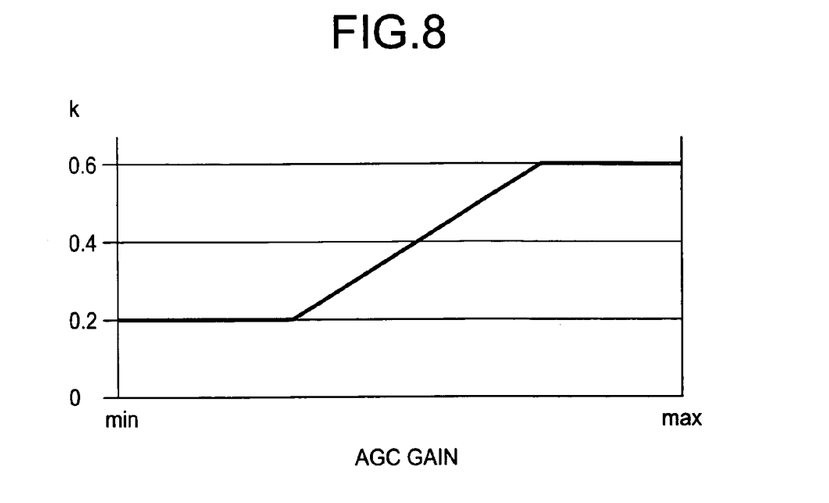
FIG. 8 is an explanatory diagram explaining the operation of the noise suppressing circuit of the invention in connection with the AGC gain.

A description will now be given of control of the noise suppression amount even with the AGC gain. If the noise suppression amount is made larger than needed, there is a side effect as has been explained above, but the case where the SN improvement is needed particularly is the case where a subject is dark and the AGC gain is large so that noise generated by the image pickup device is amplified too. Further, noise of a color signal of at that part in a pattern whose luminance level is low is prominent. Accordingly, as shown in FIG. 8, for example, the value of k is set to a small value, such as k=0.2, when the AGC gain is small (closer to min in FIG. 8), and is set to a large value, such as k=0.6, when the AGC gain is large (i.e., when there is few light: closer to max in FIG. 8) as shown in FIG. 8, and between them, the value of k is increased according to the AGC gain, the noise suppression amount can be adjusted according to the overall darkness of the subject. This is carried out as the system controller 21 in FIG. 1 adjusts the AGC gain and sets the value of k by detecting the output of the exposure state detecting section 20.

Figure 9A:
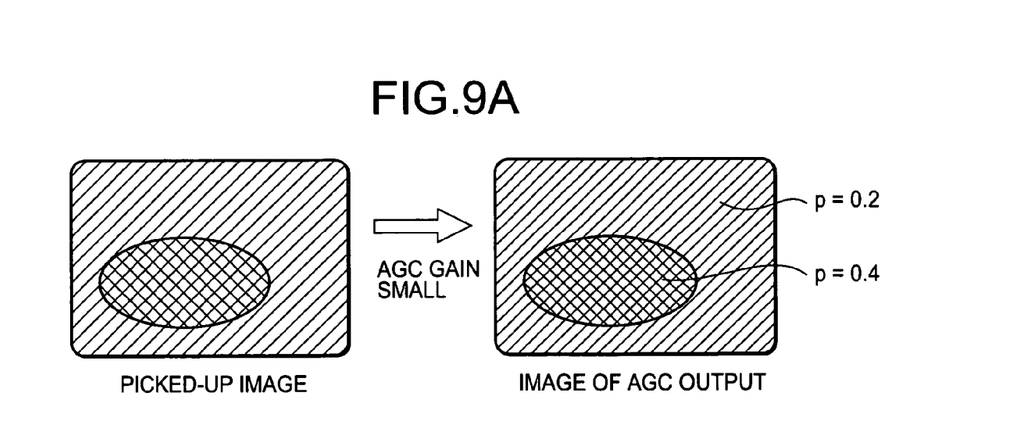
FIG. 9A is an explanatory diagram explaining the operation of the noise suppressing circuit of the invention.
Figure 9B:
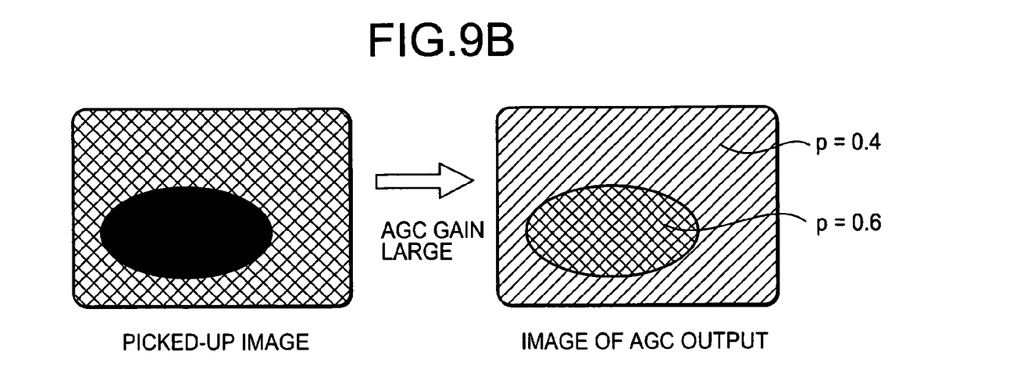
FIG. 9B is an explanatory diagram explaining the operation of the noise suppressing circuit of the invention.

A description will now be given of the advantage of combining control based on the AGC gain and control based on the luminance level with regard to noise suppression. Suppose that a pattern with an oval object at the background as shown in FIG. 9A or 9B, for example, is picked up. FIG. 9A shows a case where image pickup is done under the condition of a certain level of brightness, and FIG. 9B shows a case where image pickup is done under a dark condition as compared with FIG. 9A. The left-hand figure in each of FIGS. 9A and 9B represents a picked-up image, and the one in FIG. 9B is darker. It is assumed that as the AGC gain becomes greater when it is dark, the luminances of the AGC outputs in FIG. 9A and FIG. 9B happen to be the same.

At this time, noise stands out more in FIG. 9B than in FIG. 9A. Particularly, the portion of the oval object is originally very dark, and is therefore where color noise in particular stands out. If the invention is adapted in such a case, as shown in the right-hand figures in FIGS. 9A and 9B, the value of p of the noise suppressing circuit is not made too large in the case of FIG. 9A where the AGC gain is small to minimize the effective amount of the noise suppressing circuit, thereby reducing the side effect, and the effective amount of the noise suppressing circuit can be increased in the case of FIG. 9B where the AGC gain is large. In the case of FIG. 9B, the effective amount of the noise suppressing circuit only on particularly a dark portion of a pattern can be increased, so that the effect of noise suppression can be set finely.

A solid state image pickup device has a property such that the amount of noise differs according to the output value, so that when a dark (low luminance) portion occurs even in case where one whole screen is sufficiently bright, color noise in that portion alone becomes poor, lowering the image quality. While a PS-CCD capable of scanning two lines without mixing them in a scanning system can acquire a progressive image, and is essential for HD in future and is capable of acquiring a high vertical resolution, it is disadvantageous in terms of a noise component. Noise tends to increase as a multiple pixel architecture is further progressed in future and the light-receiving area of the solid stage image pickup device becomes narrower in proportion, so that color noise which occurs at the low luminance portion becomes more prominent. If strong suppression is applied to cancel this color noise, it influences even that portion which does not require noise suppression, thereby lowering the image quality. The invention can apply noise suppression only wherever necessary, and specific color noise suppression control is possible while keeping the image quality by controlling the suppression coefficient k, m.

In case of detecting a low luminance, control without awkwardness is possible by detecting the low luminance with a signal which matches with the color band by applying LPF to a signal with two pixels mixed, a signal with three pixels mixed, or a luminance signal, not a signal whose pixels are not mixed. The circuit structure can be made simple by replacing the coefficient K which generates the suppression gain G with a simple power of 2 (e.g., 8, 4, 2, 1, ½, ¼, ⅛ or the like). It can be adapted not only to noise suppression but also to luminance suppression.

Second Embodiment

Figure 10:
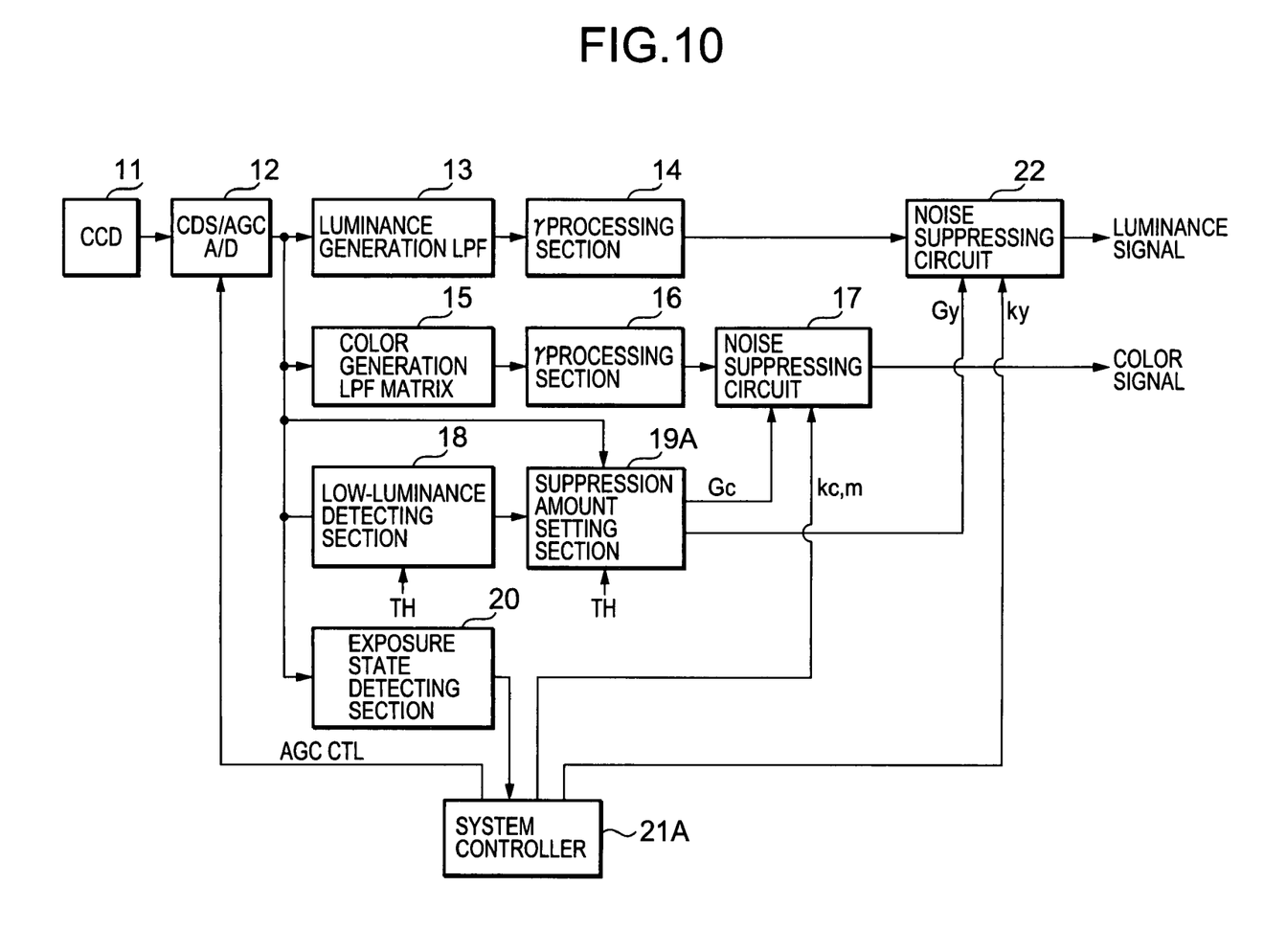
FIG. 10 is a block diagram showing an image pickup device to which the second embodiment of the noise suppressing circuit according to the invention is adapted.

The second embodiment of the invention where the noise suppressing circuit of the invention is adapted to a luminance signal will be described. FIG. 10 is a block diagram showing an image pickup device to which the second embodiment of the noise suppressing circuit according to the invention is adapted in addition to the structure of the first embodiment in FIG. 1. Like or same reference symbols are given to those components which are the same as the corresponding components in FIG. 1 to omit the description. In the structure in FIG. 10, the output signal of the γ processing section 14 of the luminance signal system is output as a luminance signal via a noise suppressing circuit 22 for the luminance signal. A suppression amount setting section 19A is so constructed as to output two gain signals Gc and Gy.

That is, while the gain signal Gc for a color signal may be identical to the gain signal G obtained by the structure in FIG. 2 (as in the first embodiment), the gain signal Gy for a luminance signal can be a signal which is, for example, proportional to the gain signal Gc for a color signal and whose value is smaller than that of the gain signal Gc for a color signal. The gain signal Gy for a luminance signal is applied to the noise suppressing circuit 22. A system controller 21A generates signals kc and ky which respectively have values of k for a color signal and k for a luminance signal, and applies them to the noise suppressing circuits 17 and 22, respectively. The value of k for a luminance signal can be made different from that for a color signal as needed, such as a value which causes the noise suppression amount of a luminance signal becomes smaller than that of a color signal.

The two types of gain signals Gc and Gy generated by the suppression amount setting section 19A in the second embodiment can take various modified modes as needed, as per the scheme of providing gains indicating various modified modes which have been discussed on the first embodiment referring to FIGS. 3A to 3E.

Although noise suppression is performed on both a color signal and a luminance signal in the second embodiment, the invention is not limited to the first embodiment and the second embodiment, but is adaptable to a case where noise suppression is performed just on a luminance signal. That is, only noise suppression on a luminance signal can be performed by taking the structure which eliminates the noise suppressing circuit 17 from the structure of the second embodiment in FIG. 10 and using the output signal of the γ processing section 16 directly as a color signal output.

What is claimed is:

1. A noise suppressing circuit using luminance detection, comprising:
   color-signal component extraction means which extracts a color signal component in an input video signal;
   low-luminance detection means which detects that luminance of said input video signal is lower than a predetermined value;
   noise-suppression amount signal generation means that generates a signal indicative of a noise suppression amount, which is a value which becomes greater as the luminance of said input video signal becomes lower and suppresses noise in said color signal component, in response to an output signal of said low-luminance detection means only when the luminance of said input video signal is lower than said predetermined value; and
   noise suppression means which suppresses noise with the noise suppression amount generated by said noise-suppression amount signal generation means with respect to said color signal component extracted by said color-signal component extraction means.

2. The noise suppressing circuit using luminance detection according to claim 1, wherein said noise-suppression amount signal generation means is constructed in such a way that said noise suppression amount which changes with respect to a change in luminance of said input video signal changes linearly, or like a veered line or in a curve.

3. The noise suppressing circuit using luminance detection according to claim 1, wherein said noise-suppression amount signal generation means is constructed in such a way as to compare and control input signals using a plurality of thresholds and gains corresponding thereto.

4. The noise suppressing circuit using luminance detection according to claim 1, further comprising an exposure state detecting section which detects an exposure state in response to said input video signal and control means which generates a suppression coefficient as a feedback amount or a coring amount in response to an output signal of said exposure state detecting section, and wherein said suppression coefficient is so designed as to be supplied to said noise suppression means and used to determine a mode of noise suppression.

5. The noise suppressing circuit using luminance detection according to claim 1, further comprising an AGC circuit which responds to a video signal, and whose output signal is used as said input video signal.

6. A noise suppressing circuit using luminance detection, comprising:
   luminance-signal component extraction means which extracts a luminance signal component in an input video signal;
   low-luminance detection means which detects that luminance of said input video signal is lower than a predetermined value;
   noise-suppression amount signal generation means that generates a signal indicative of a noise suppression amount, which is a value which becomes greater as the luminance of said input video signal becomes lower and suppresses noise in said luminance signal component, in response to an output signal of said low-luminance detection means only when the luminance of said input video signal is lower than said predetermined value; and
   noise suppression means which suppresses noise with the noise suppression amount generated by said noise-suppression amount signal generation means with respect to said luminance signal component extracted by said luminance-signal component extraction means.

7. The noise suppressing circuit using luminance detection according to claim 6, wherein said noise-suppression amount signal generation means is constructed in such a way that said noise suppression amount which changes with respect to a change in luminance of said input video signal changes linearly, or like a veered line or in a curve.

8. The noise suppressing circuit using luminance detection according to claim 6, wherein said noise-suppression amount signal generation means is constructed in such a way as to compare and control input signals using a plurality of thresholds and gains corresponding thereto.

9. The noise suppressing circuit using luminance detection according to claim 6, further comprising an exposure state detecting section which detects an exposure state in response to said input video signal and control means which generates a suppression coefficient as a feedback amount or a coring amount in response to an output signal of said exposure state detecting section, and wherein said suppression coefficient is so designed as to be supplied to said noise suppression means and used to determine a mode of noise suppression.

10. The noise suppressing circuit using luminance detection according to claim 6, further comprising an AGC circuit which responds to a video signal, and whose output signal is used as said input video signal.

11. A noise suppressing circuit using luminance detection, comprising:
    color-signal component extraction means which extracts a color signal component in an input video signal;
    luminance-signal component extraction means which extracts a luminance signal component in the input video signal;
    low-luminance detection means which detects that luminance of said input video signal is lower than a predetermined value;
    noise-suppression amount signal generation means that generates a first signal indicative of a first noise suppression amount, which is a value which becomes greater as the luminance of said input video signal becomes lower and suppresses noise in said color signal component, and a second signal indicative of a second noise suppression amount, which is a value which becomes greater as the luminance of said input video signal becomes lower and suppresses noise in said luminance signal component, in response to an output signal of said low-luminance detection means only when the luminance of said input video signal is lower than said predetermined value;

first noise suppression means which suppresses noise with said first noise suppression amount generated by said noise-suppression amount signal generation means with respect to said color signal component extracted by said color-signal component extraction means; and second noise suppression means which suppresses noise with said second noise suppression amount generated by said noise-suppression amount signal generation means with respect to said luminance signal component extracted by said luminance-signal component extraction means.

12. The noise suppressing circuit using luminance detection according to claim 11, wherein said noise-suppression amount signal generation means is constructed in such a way that said noise suppression amount which changes with respect to a change in luminance of said input video signal changes linearly, or like a veered line or in a curve.

13. The noise suppressing circuit using luminance detection according to claim 11, wherein said noise-suppression amount signal generation means is constructed in such a way as to compare and control input signals using a plurality of thresholds and gains corresponding thereto.

14. The noise suppressing circuit using luminance detection according to claim 11, further comprising an exposure state detecting section which detects an exposure state in response to said input video signal and control means which generates a suppression coefficient as a feedback amount or a coring amount in response to an output signal of said exposure state detecting section, and wherein said suppression coefficient is so designed as to be supplied to said noise suppression means and used to determine a mode of noise suppression.

15. The noise suppressing circuit using luminance detection according to claim 11, further comprising an AGC circuit which responds to a video signal, and whose output signal is used as said input video signal.

* * * * *